Oct. 23, 1951 H. L. HILDESTAD 2,572,723
COMBUSTION APPARATUS PROVIDED WITH A FLAME-HOLDING ASSEMBLY
Filed April 18, 1950
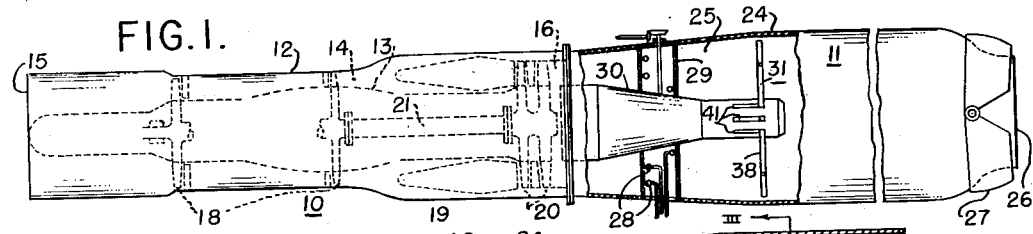
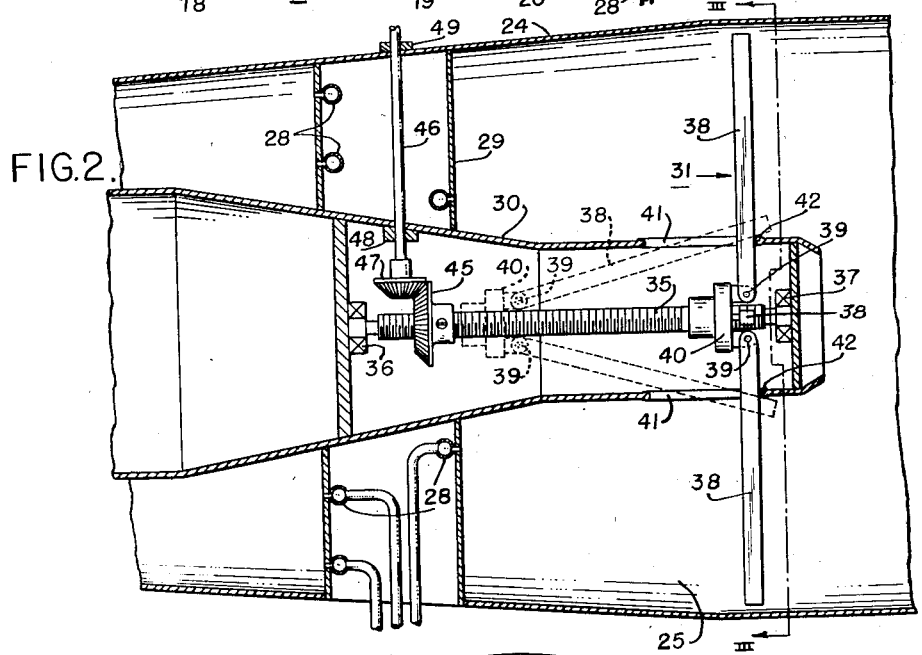
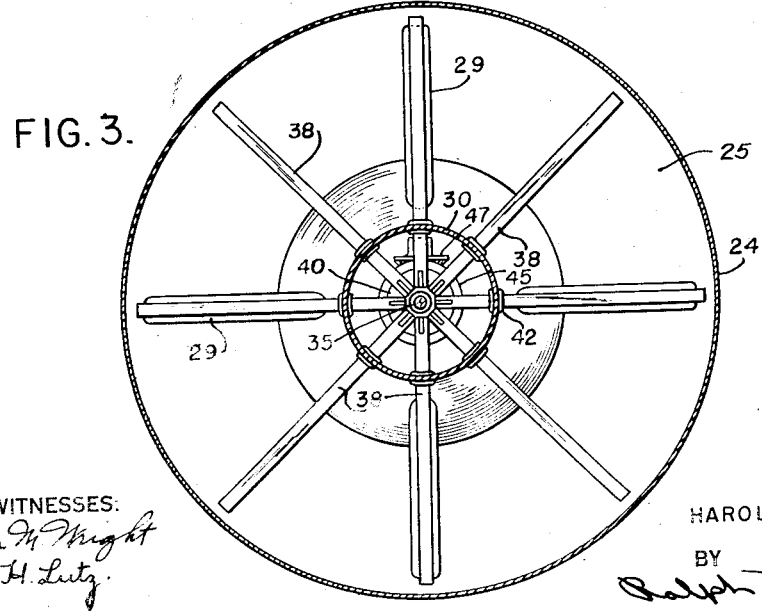
WITNESSES:
John M. Wright
E. H. Lutz
INVENTOR
HAROLD L. HILDESTAD
BY Ralph T. French
ATTORNEY Patented Oct. 23, 1951

2,572,723

UNITED STATES PATENT OFFICE 2,572,723

COMBUSTION APPARATUS PROVIDED WITH A FLAME-HOLDING ASSEMBLY

Harold L. Hildestad, Swarthmore, Pa., assignor to Westinghouse Electric Corporation, East Pittsburgh, Pa., a corporation of Pennsylvania Application April 18, 1950, Serial No. 156,557

4 Claims. (Cl. 60—39.72)

1

This invention relates to power plants, and more particularly to an aviation power plant of the jet propulsion class.

To augment the available thrust output of an aviation jet propulsion power plant, such as a turbojet engine, it has been proposed to provide afterburner apparatus adapted for combustion of additional fuel in the stream of gases flowing from the turbine. The velocity of turbine exhaust gases flowing through such an afterburner is normally greater than fifty feet per second, tending to exceed that of the flame of combustion of the afterburner fuel, and is preferably controlled by imposition of a flame-holder in the gas stream, so that sufficient local stagnation can be produced to ensure that the flame will be maintained in the desired combustion region of the power plant. It is a principal object of the present invention to provide an improved flame-holder device of this type.

With a stationary flame-holder, the large projected area of the element relative to the gas flow area tends to effect unnecessary pressure drop and consequent thrust loss during nonafterburning operation of the power plant. Furthermore, operation of the afterburner to effect partial thrust augmentation is difficult, when a nonadjustable flame-holder is employed. It is another object of the present invention to provide a retractible flame-holder assembly serving to obviate the foregoing difficulties.

A further object is the provision of an improved flame-holder assembly for a turbojet power plant, including retractible elements movable in increments or steps through a range of operative positions for varying the available thrust augmentation characteristics thereof, and having a fully retracted position in which thrust loss due to pressure drop induced by the flameholder is reduced to zero, when it is desired to operate the turbojet power plant without afterburning.

These and other objects are effected by the invention as will be apparent from the following description and claims taken in connection with the accompanying drawing, forming a part of this application, in which:

Fig. 1 is a diagrammatic elevational view, partly in section, of a typical turbojet power plant equipped with an afterburner and an improved

2 flame-holder device constructed in accordance with the invention;

Fig. 2 is an enlarged detail, sectional view of the flame-holder and related portions of the afterburner shown in Fig. 1; and Fig. 3 is a sectional view, in enlarged detail, of a portion of the flame-holder apparatus, taken along the line III—III of Fig. 2.

The power plant shown schematically in Fig. 1 includes a gas turbine engine 10 and an afterburner apparatus 11, which are adapted to be mounted in the fuselage or wing of an aircraft (not shown). The gas turbine engine 10 comprises a generally cylindrical casing structure 12 having mounted along the axis thereof an inner sectional core structure 13, the annular space formed between the two structures constituting a fluid flow passageway 14 which extends through the engine envelope from a forwardly directed air inlet opening 15 to a turbine exhaust communication 16. The operating elements of the engine are mounted in axial alignment within the casing structure 12, in order to minimize the frontal dimensions of the engine and consequent drag thereof during flight of the aircraft. These elements comprise an axial-flow compressor 18, annular combustion apparatus 19 and a turbine 20, the rotor of which is operatively connected to the rotor of the compressor 18 by a shaft 21 having suitable journaled support in the casing structure.

The afterburner apparatus 11 comprises a cylindrical casing structure 24, the forward end of which is suitably fitted to the complementary turbine discharge end of the engine casing structure 12, so that the interior space or combustion chamber 25 of the afterburner apparatus communicates with the turbine discharge passage 16. The afterburner combustion chamber 25 extends axially through the casing structure 24 to a rearwardly disposed exhaust nozzle 26, which may be equipped with suitable variable flow controlling mechanism 27. Mounted within the combustion chamber 25 are a plurality of fuel supply nozzles and manifolds 28, which are adapted to be connected to a suitable afterburner fuel control system (not shown). The manifolds 28 may be supported by radially disposed struts 29 extending from the casing structure 24. An axially arranged tubular fairing 30, also carried on the struts 29, is coaxially disposed in the chamber 25 and extends from a plane downstream of the turbine 20 to a point intermediate the manifolds 28 and the nozzle 26. The downstream end of the fairing 30 carries a flame-holder assembly 31, which is constructed in accordance with the invention as hereinafter more fully explained.

In operation of the power plant, air entering the inlet opening 15 is compressed by the compressor 18 and delivered to the annular combustion apparatus 19 for supporting combustion of fuel that is supplied thereto through the medium of suitable nozzles (not shown). The resultant hot motive fluid issuing from the combustion apparatus 19 is then expanded through the turbine 20 and exhausted into the combustion chamber 25 of the afterburner apparatus 11, where additional fuel directed from the manifolds 28 toward the flame-holder device 31, hereinafter described, may be burned when it is desired to augment the thrust energy of the gases finally discharged through the nozzle 26.

According to the invention, the flame-holder device 31 is mounted in the combustion chamber 25 of the afterburner apparatus 11 at a position downstream of the manifolds 28 but well in advance of the nozzle 26, as shown in Fig. 1. Referring to Fig. 2, the flame-holder assembly 31 comprises a screw-threaded rotary shaft 35 mounted coaxially within the fairing 30, the opposite ends of the shaft being journaled in suitable bearings 36 and 37, and a plurality of radially disposed arms 38, the inner ends of which are pivotally connected by pins 39 to radial lug portions of a nut element 40 having a threaded bore and movably engaged on the shaft 35. The nut element 40 is movable along the rotary shaft 40 from the rear position illustrated to a forward position as shown in dotted lines in Fig. 2. The radial arms 38 extend outwardly through correspondingly spaced longitudinal slots 41 formed in the fairing 30, and are adapted to ride over rounded downstream end walls 42 of the respective slots when the ends connected to the nut element 40 are moved rearwardly therewith, or toward the right as viewed in Fig. 2. During traverse of the nut element 40 to its forward position, the arms 38 are drawn against the upstream edges of the slots 41 and are thereby gradually retracted into the fairing 30, until movement to the fully retracted position, as shown in dotted lines. It will be apparent that the several arms 38 are thus adapted to be readily removed and renewed in case it becomes necessary to effect repairs following extended operation of the afterburner.

Suitable gearing may be provided for effecting selective rotation of the shaft 35, such as a bevel gear 45 secured to the forward end thereof, and a laterally disposed shaft 46 having a bevel gear 47 meshed with the first gear and adapted to be operated by conventional actuator motor means (not shown), which may be mounted externally of the power plant. The shaft 46 is contained within one of the struts 29 and is adapted to be journaled on bearings 48 and 49 carried on the fairing 30 and outer casing 24, respectively.

From the foregoing, it will thus be seen that a retractible flame-holder device constructed in accordance with the invention may be variously positioned to present sufficient drag or surface area to effect proper retention of a combustion flame for augmenting thrust to any desired degree in a conventional afterburner apparatus. Under non-afterburning conditions, or when the power plant is operated only on the thrust of the turbine exhaust, the flame-holder assembly may be retracted to reduce pressure loss to zero. The relatively loosely connected elements of the improved flame-holder assemblage are adapted to expand and contract independently, to avoid undue stressing upon sudden changes in thermal characteristics. With the flame-holder device supported through the medium of pins having limited contact only with the central fairing structure, local supports that might effect transfer of heat to the outer casing structure are eliminated. In addition, the separate elements of the assembly are individually replaceable in the event of failure of any part in service, without necessitating the discarding of other elements in good condition.

While the invention has been shown in but one form, it will be obvious to those skilled in the art that it is not so limited, but is susceptible of various changes and modifications without departing from the spirit thereof.

What is claimed is:

1. In combustion apparatus for a power plant, casing structure forming a combustion chamber through which burning fuel and hot motive gases are propelled at high velocity, a retractible flame-holder assembly normally interposed in said chamber for creating a degree of stagnancy in the gas stream sufficient to effect retention of a flame formation within the combustion chamber, said flame-holder assembly comprising a plurality of radially arranged retractible members, and means operatively connected to the inner ends of said members for effecting outward or inward movement thereof relative to said chamber.

2. In combustion apparatus for a power plant, casing structure forming a combustion chamber through which burning fuel and hot motive gases are propelled at high velocity, a retractible flame-holder assembly normally interposed in said chamber for creating a degree of stagnancy in the gas stream sufficient to effect retention of a flame formation within the combustion chamber, said flame-holder assembly comprising a plurality of radially arranged retractible members, an actuating member operatively connected to said retractible members, and means for effecting travel of said operating member along the axis of said power plant from a position in which said retractible members are fully projected into said chamber to a position in which said retractible members are substantially withdrawn from said chamber.

3. In combustion apparatus for a power plant, casing structure forming a combustion chamber through which burning fuel and hot motive gases are propelled at high velocity, a retractible flame-holder assembly interposed in said chamber for creating a degree of stagnancy in the gas stream sufficient to effect retention of a flame formation within the combustion chamber, said flame-holder assembly comprising a central fairing structure, a longitudinally shiftable element mounted therein, a plurality of radially disposed arms having inner ends connected to said element and slidably engaging said fairing structure, said arms being freely extendable from a retracted position within said fairing structure to an outer position within said chamber in a plane normal relative to the axis of said casing.

4. In combustion apparatus for a power plant, casing structure having an apertured central fairing and forming an annular combustion chamber through which burning fuel and hot motive gases are propelled at high velocity, a retractible flame-holder assembly supported on said fairing and adapted to be interposed in the stream of gases for creating a degree of stagnancy sufficient to effect retention of a flame formation within the combustion chamber, said flame-holder assembly comprising a plurality of spaced radially arranged arm elements having outer portions extending into said combustion chamber and inner ends slidably engaged in the apertures of said fairing, actuating means including an axially disposed rotary threaded shaft journaled in said fairing, and a nut engaged on said shaft and pivotally connected to said inner ends of the arm elements, whereby said arm elements of the flame-holder assembly are rendered relatively movable outwardly into said chamber or inwardly toward a retracted position within said fairing for varying the flame-holding characteristics of said assembly.

HAROLD L. HILDESTAD.

REFERENCES CITED

The following references are of record in the file of this patent:

UNITED STATES PATENTS

| Number | Name | Date |
|---|---|---|
| 2,503,006 | Stalker | Apr. 4, 1950 |